(12) United States Patent
Liu et al.

(10) Patent No.: US 8,828,343 B2
(45) Date of Patent: Sep. 9, 2014

(54) CARBON MONOXIDE CONVERSION CATALYST

(75) Inventors: Xinsheng Liu, Edison, NJ (US); Ye Liu, Holmdel, NJ (US); Pascaline Harrison Tran, Holmdel, NJ (US); Keshavaraja Alive, South Plainfield, NJ (US); Michael P. Galligan, Cranford, NJ (US)

(73) Assignee: BASF Corporation, Florham Park, NJ (US)

( * ) Notice: Subject to any disclaimer, the term of this patent is extended or adjusted under 35 U.S.C. 154(b) by 436 days.

(21) Appl. No.: 13/038,784

(22) Filed: Mar. 2, 2011

(65) Prior Publication Data
US 2011/0217216 A1    Sep. 8, 2011

Related U.S. Application Data

(60) Provisional application No. 61/310,922, filed on Mar. 5, 2010.

(51) Int. Cl.
| | |
|---|---|
| *F01N 3/10* | (2006.01) |
| *B01D 53/56* | (2006.01) |
| *B01D 53/94* | (2006.01) |
| *B01J 8/02* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *B01J 35/00* | (2006.01) |
| *B01J 23/63* | (2006.01) |
| *B01J 37/02* | (2006.01) |
| *B01J 35/04* | (2006.01) |

(52) U.S. Cl.
CPC ........... *B01D 53/945* (2013.01); *B01J 35/0006* (2013.01); *B01D 2255/2065* (2013.01); *B01D 2255/1023* (2013.01); *Y02T 10/22* (2013.01); *B01D 2255/1025* (2013.01); *B01J 23/63* (2013.01); *B01D 2255/908* (2013.01); *B01J 37/0228* (2013.01); *B01D 2255/9022* (2013.01); *B01D 2255/1021* (2013.01); *B01D 2255/2066* (2013.01); *B01D 2255/2092* (2013.01); *B01D 2258/014* (2013.01); *B01J 37/0244* (2013.01); *B01D 2255/40* (2013.01); *B01J 37/0248* (2013.01); *B01J 35/04* (2013.01); *B01D 2255/20715* (2013.01); *Y10S 502/52712* (2013.01); *Y10S 502/52713* (2013.01)
USPC .......... 423/213.5; 60/299; 502/261; 502/262; 502/302; 502/303; 502/304; 502/326; 502/332; 502/333; 502/334; 502/339; 502/349; 502/350; 502/351; 502/355; 502/415; 502/439; 502/527.12; 502/527.13

(58) Field of Classification Search
USPC ......... 502/261–262, 302–304, 326, 332–334, 502/339, 349–351, 355, 415, 439, 527.12, 502/527.13; 60/299; 423/213.5
See application file for complete search history.

(56) References Cited

U.S. PATENT DOCUMENTS

| | | | |
|---|---|---|---|
| 5,593,647 A | 1/1997 | Kirby | |
| 5,597,771 A * | 1/1997 | Hu et al. | ........................ 502/304 |

(Continued)

FOREIGN PATENT DOCUMENTS

WO    WO-2009/043390 A2    4/2009

*Primary Examiner* — Cam N. Nguyen
(74) *Attorney, Agent, or Firm* — Melanie L. Brown

(57) ABSTRACT

Catalyst articles comprising palladium and related methods of preparation and use are disclosed. Disclosed is a catalyst article comprising a first catalytic layer formed on a substrate, wherein the first catalytic layer comprises palladium impregnated on a ceria-free oxygen storage component and platinum impregnated on a refractory metal oxide, and a second catalytic layer formed on the first catalytic layer comprising platinum and rhodium impregnated on a ceria-containing oxygen storage component. The palladium component of the catalyst article is present in a higher proportion relative to the other platinum group metal components. The catalyst articles provide improved conversion of carbon monoxide in exhaust gases, particularly under rich engine operating conditions.

20 Claims, 5 Drawing Sheets

(56) References Cited

U.S. PATENT DOCUMENTS

| | | | | |
|---|---|---|---|---|
| 5,948,723 | A * | 9/1999 | Sung | 502/303 |
| 6,261,989 | B1 * | 7/2001 | Tanaka et al. | 502/217 |
| 6,294,140 | B1 * | 9/2001 | Mussmann et al. | 423/213.5 |
| 6,306,794 | B1 * | 10/2001 | Suzuki et al. | 502/304 |
| 6,497,851 | B1 | 12/2002 | Hu et al. | |
| 6,764,665 | B2 * | 7/2004 | Deeba et al. | 423/239.1 |
| 6,764,995 | B2 * | 7/2004 | O'Reilly et al. | 514/13.3 |
| 6,881,384 | B1 * | 4/2005 | Uenishi et al. | 422/177 |
| 7,276,212 | B2 * | 10/2007 | Hu et al. | 422/177 |
| 7,314,846 | B2 * | 1/2008 | Kuno | 502/326 |
| 7,374,729 | B2 * | 5/2008 | Chen et al. | 422/177 |
| 7,396,516 | B2 * | 7/2008 | Fisher et al. | 423/213.2 |
| 7,501,098 | B2 * | 3/2009 | Chen et al. | 422/177 |
| 7,517,510 | B2 * | 4/2009 | Chen et al. | 423/213.2 |
| 7,524,465 | B2 * | 4/2009 | Kumar et al. | 422/180 |
| 7,550,124 | B2 * | 6/2009 | Chen et al. | 423/213.2 |
| 7,622,096 | B2 * | 11/2009 | Deeba et al. | 423/213.2 |
| 7,754,171 | B2 * | 7/2010 | Chen et al. | 423/213.2 |
| 7,758,834 | B2 * | 7/2010 | Chen et al. | 423/213.2 |
| 7,759,283 | B2 * | 7/2010 | Yamato et al. | 502/339 |
| 7,785,545 | B2 * | 8/2010 | Miyoshi et al. | 422/180 |
| 7,795,172 | B2 * | 9/2010 | Foong et al. | 502/327 |
| 7,816,300 | B2 * | 10/2010 | Takeuchi et al. | 502/325 |
| 7,871,956 | B2 * | 1/2011 | Wakita et al. | 502/304 |
| 7,875,250 | B2 * | 1/2011 | Nunan | 422/177 |
| 7,879,755 | B2 * | 2/2011 | Wassermann et al. | 502/304 |
| 7,922,988 | B2 * | 4/2011 | Deeba et al. | 423/213.2 |
| 7,947,238 | B2 * | 5/2011 | Deeba | 423/213.2 |
| 7,981,390 | B2 * | 7/2011 | Galligan et al. | 423/213.5 |
| 8,007,750 | B2 * | 8/2011 | Chen et al. | 423/239.1 |
| 8,038,951 | B2 * | 10/2011 | Wassermann et al. | 422/168 |
| 8,202,819 | B2 * | 6/2012 | Kohara et al. | 502/304 |
| 2001/0036432 | A1 * | 11/2001 | Hu et al. | 423/213.5 |
| 2002/0131914 | A1 | 9/2002 | Sung | |
| 2003/0100447 | A1 | 5/2003 | Deeba et al. | |
| 2004/0028589 | A1 * | 2/2004 | Reisinger et al. | 423/240 S |
| 2008/0042104 | A1 | 2/2008 | Chen et al. | |
| 2008/0044330 | A1 * | 2/2008 | Chen et al. | 423/213.5 |
| 2008/0045404 | A1 | 2/2008 | Han et al. | |
| 2009/0022641 | A1 * | 1/2009 | Chen et al. | 423/239.1 |
| 2009/0041645 | A1 * | 2/2009 | Wassermann et al. | 423/213.5 |
| 2010/0275579 | A1 | 11/2010 | Klingmann et al. | |

* cited by examiner

CARBON MONOXIDE CONVERSION CATALYST

CROSS-REFERENCE TO RELATED APPLICATIONS

This application claims the benefit of priority under 35 U.S.C. §119(e) to U.S. Patent Application No. 61/310,922, filed Mar. 5, 2010, which is hereby incorporated by reference in its entirety.

TECHNICAL FIELD

This invention pertains to catalyst articles useful for treatment of gaseous streams containing hydrocarbons, carbon monoxide and nitrogen oxides, methods of using the catalyst articles to treat the gaseous streams and methods of making the catalyst articles. More particularly, the invention provides catalyst articles and methods for treatment of exhaust produced by internal combustion engines, including carbureted motorcycle engines.

BACKGROUND

The exhaust gases of internal combustion engines contain pollutants such as hydrocarbons, carbon monoxide and nitrogen oxides ($NO_x$) that foul the air. Emission standards for unburned hydrocarbons, carbon monoxide and nitrogen oxide contaminants have been set by various governments and must be met by older as well as new vehicles. In order to meet such standards, catalytic converters containing a three way catalyst (TWC) may be located in the exhaust gas line of internal combustion engines. The use of exhaust gas catalysts have contributed to a significant improvement in air quality. The TWC is the most commonly used catalyst and it provides the three functions of oxidation of carbon monoxide (CO), oxidation of unburned hydrocarbons (HC's) and reduction of NOx to $N_2$. TWCs typically utilize one or more platinum group metals (PGM) to simultaneously oxidize CO and HC and reduce NOx compounds. The most common catalytic components of a TWC are platinum (Pt), rhodium (Rh) and palladium (Pd).

TWC catalysts perform best when the engine operates at or close to stoichiometric conditions (air/fuel ratio, $\lambda=1$). In actual use, however, engines must operate on either side of $\lambda=1$ at various stages during an operating cycle. For example, under rich operating conditions such as during acceleration, the exhaust gas composition is reductive and it is more difficult to carry out oxidation reactions on the catalyst surface. For this reason, TWC's have been developed to incorporate a component which stores oxygen during lean portions of the operating cycle and releases oxygen during rich portions of the operating cycle. This component is ceria-based in most commercial TWC's. Unfortunately, when ceria is doped with precious metal catalysts it tends to lose surface area when exposed to high temperatures, e.g. 800° C. or above, and the overall performance of the catalyst is degraded. TWC's have therefore been developed which use ceria-zirconia mixed oxides as the oxygen storage component, as the mixed oxides are more stable to loss of surface area than ceria alone. TWC catalysts are generally formulated as washcoat compositions containing supports, oxygen storage components and PGMs. Such catalysts are designed to be effective over a specific range of operating conditions which are both lean and rich as compared to stoichiometric conditions.

The platinum group metals in the TWC catalysts (e.g., platinum, palladium, rhodium, rhenium and iridium) are typically disposed on a high surface area, refractory metal oxide support, e.g., a high surface area alumina coating, or on an oxygen storage component. The support is carried on a suitable carrier or substrate such as a monolithic substrate comprising a refractory ceramic or metal honeycomb structure, or refractory particles such as spheres or short, extruded segments of a suitable refractory material. The TWC catalyst substrate may also be a wire mesh, typically a metal wire mesh, which is particularly useful in small engines.

Refractory metal oxides such as alumina, bulk ceria, zirconia, alpha alumina and other materials may be used as supports for the catalytic components of a catalyst article. The alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Although many of the other refractory metal oxide supports suffer from the disadvantage of having a considerably lower BET surface area than activated alumina, that disadvantage tends to be offset by a greater durability of the resulting catalyst. Oxygen storage components, such as discussed above, may also be used as supports for the PGM components of the TWC.

In an operating engine, exhaust gas temperatures can reach 1000° C., and such elevated temperatures cause the support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. Alumina supports may be stabilized against such thermal degradation by the use of materials such as zirconia, titania, alkaline earth metal oxides such as baria, calcia or strontia or rare earth metal oxides, such as ceria, lanthana and mixtures of two or more rare earth metal oxides.

Automotive catalyst stability is tested in the laboratory by exposing the catalyst to accelerated aging under laboratory conditions in different atmospheres. These testing protocols mimic operating conditions in the engine, including high temperature and lean/rich perturbations in the exhaust. Such tests typically include high temperature in the presence or absence of water. Two types of accelerated aging protocols are steam/air (oxidative hydrothermal aging, simulating lean operating conditions) or aging under nitrogen, argon or hydrogen (inert aging, simulating rich operating conditions). Although testing under both of these catalyst aging conditions provides better reproduction of catalyst performance in actual use in the engine environment, most attention in the field has been paid to developing catalysts that survive high temperature steam/air aging conditions. Little work has been done to address catalyst stability under high temperature rich aging. Current catalyst technology exhibits significant catalyst deactivation under rich aging conditions, particularly when exposed in sequence to both the steam/air protocol and high temperature rich aging protocols.

In a carbureted motorcycle engine, wide ranges of air to fuel ratios are often encountered as a result of loose control by the carburetor. An emission control catalyst is therefore required to function in this wide range of environments and often loses CO conversion activity under rich aging conditions. Thus, there is a need for a TWC-containing catalyst article with improved CO conversion performance and stability after hydrothermal aging, particularly under rich engine operating conditions. The catalysts of the invention meet this need. It is known that the conversion of CO under rich conditions is accomplished by two reactions: oxidation ($CO + \frac{1}{2}O_2 = CO_2$) and water gas shift (WGS) ($CO + H_2O = CO_2 + H_2$). It has now been found that hydrothermal aging processes are more detrimental to the WGS reaction than to the oxidation reaction and that maintaining good PGM dispersion under these conditions is essential for WGS activity. The inventive catalysts described herein exhibit improved PGM dispersion after hydrothermal aging and provide improved catalyst performance.

SUMMARY

An embodiment of the present invention is directed to a catalyst article and related methods of preparation and use. In one aspect, a first catalytic layer is formed on a carrier substrate, wherein the first catalytic layer comprises palladium impregnated on a ceria-free oxygen storage component. The ceria-free oxygen storage component may be a composite of zirconia and a rare earth metal oxide other than ceria, for example praseodymia, neodymia or lanthana. The first catalytic layer may also comprise platinum and/or palladium impregnated on a refractory metal oxide support. A second catalytic layer is formed on the first catalytic layer, wherein the second catalytic layer comprises platinum and rhodium impregnated on an OSC support with a high content of cerium. The second catalytic layer is palladium-free and substantially free of refractory metal oxides. In one embodiment, the catalyst article exhibits improved stability and CO conversion performance relative to known TWC catalyst articles, particularly under rich operating conditions. The substrate of the catalyst article may typically be a honeycomb structure. The catalyst article may further comprise an optional etch coat layer formed on a substrate, wherein the etch coat layer comprises a refractory metal oxide and has a surface that is substantially uniform.

In another aspect of the invention, the catalyst article is made by optionally coating on a substrate an etch coat layer comprising a refractory metal oxide in an acidic sol, drying the etch coat layer to obtain a substantially uniform surface, depositing a first catalytic layer on the etch coat layer by coating a slurry on the etch coat layer (if present) or on the substrate (if the etch coat layer is not present), the slurry comprising 1) a ceria-free oxygen storage component impregnated with palladium and 2) platinum impregnated on a refractory metal oxide support, and drying the first catalytic layer. A portion of the palladium in the first catalytic layer may also be impregnated on the refractory metal oxide support. The ceria-free oxygen storage component of the first catalytic layer may be a composite of zirconia and a rare earth metal oxide other than ceria, for example praseodymia, neodymia or lanthana. A second catalytic layer is deposited on the first catalytic layer by coating a slurry on the first catalytic layer, the slurry comprising platinum and rhodium impregnated on a ceria OSC which is substantially free of refractory metal oxides, wherein the OSC has a high content of cerium.

The catalyst articles of the invention are particularly useful for treating exhaust produced by internal combustion engines, such as carbureted motorcycle engines, where lean/rich fluctuations in operating conditions produce high variation in exhaust contaminants that must be removed. In particular, conventional catalyst articles are subject to rapid loss of activity for CO conversion under rich conditions. The catalyst articles of the invention exhibit substantially less deterioration in CO conversion relative to performance of the fresh catalyst under such operating conditions.

DETAILED DESCRIPTION

Figure 1:
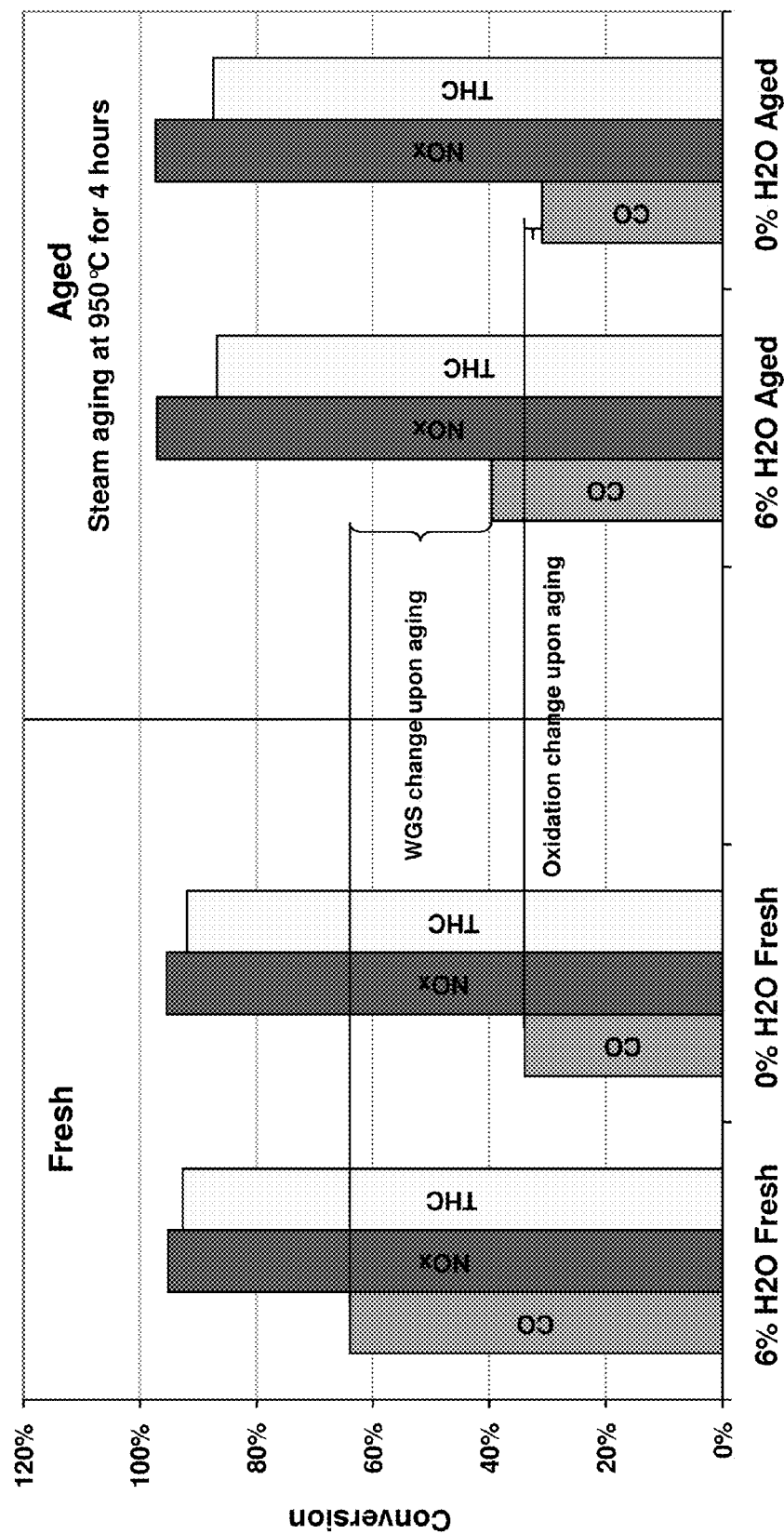
FIG. 1 is a bar graph showing the relative contributions of the WSC and oxidation reactions to CO conversion with catalyst aging.

The present invention relates to catalyst articles, components of catalyst articles, methods of using the catalyst articles and methods of making the catalyst articles generally referred to as a three-way conversion catalyst and having the capability of simultaneously catalyzing the oxidation of hydrocarbons and carbon monoxide and the reduction of nitrogen oxides. The catalyst article according to an embodiment of the invention comprises at least two washcoat layers. It has been found that substantially improved performance under rich operating conditions is achieved by providing two catalyst-containing layers on a substrate, wherein the first catalytic layer comprises a high level of palladium relative to platinum and rhodium in the catalyst article. In the first catalytic layer, the palladium component is supported on a ceria-free oxygen storage component. A portion of the palladium may also be supported on a refractory metal oxide. The platinum component of the first catalytic layer is supported on a refractory metal oxide; however, a portion of the platinum component may also be supported on the ceria-free oxygen storage component. The second catalytic layer is substantially free of refractory metal oxides such as zirconia and alumina and substantially free of non-ceria rare earth oxides, and comprises platinum and rhodium supported on an oxygen storage component having a high content of cerium.

As used herein, the term "high content of cerium" with reference to an oxygen storage component means the OSC contains ceria ($CeO_2$) in an amount by weight of from about 45% to about 100%, for example about 60% to about 100%, about 80% to 100%, about 90% to about 100% or about 100%. The ceria-containing OSC may contain additional components such as non-ceria rare earth oxides or refractory metal oxides such as zirconia or alumina. Such additional components will typically be present in amounts less than about 55% by weight of the ceria-containing OSC, but generally should represent no more than about 5-40% by weight of the OSC. In one aspect of the invention the ceria-containing support for platinum and rhodium in the second catalytic layer is pure ceria, also referred to as bulk ceria. In a further aspect, the supports for platinum and rhodium in the second catalytic layer are pure ceria and Zr-doped alumina, wherein the amount of alumina in the second catalytic layer is less than or equal to about 15% by weight of the second catalytic layer.

As used herein, the term "ceria-free oxygen storage component" or "ceria-free OSC" refers to an OSC which contains less than 1% ceria, preferably less than 0.5% ceria, and most preferably essentially 0% ceria. Examples of ceria-free OSCs include zirconia-praseodymia, zirconia-neodymia, zirconia-yttria and zirconia-lanthana.

As used herein, the term "substantially free of refractory metal oxides" and its equivalents with respect to an OSC means that refractory metal oxides conventionally used to stabilize OSC's are present in the OSC in amounts of no more than about 50% by weight, for example about 20% to 50%, about 5% to 30%, about 0% to 10%, about 0% to 5% or are essentially absent.

As used herein, the term "substantially free of non-ceria rare earth oxides" or its equivalents with respect to an OSC means that ceria represents the majority of the rare earth oxides present in the OSC. If other rare earth oxides are present, they are in an amount of no more than about 10% by weight, for example about 5% to 10%, about 5% or are essentially absent. Non-ceria rare earth oxides include lanthana, praseodymia and neodymia, the total of which will not exceed about 10% by weight of the catalytic layer.

As used herein, the term "high-palladium" with reference to a catalyst article or a layer of a catalyst article means the content of palladium by weight in the article or layer is higher than the content by weight of non-palladium PGM components in the article or layer. Preferably, the palladium content is higher than each of the non-palladium PGM components. More preferably, the palladium content is higher than the total content of all non-palladium PGM components. In one aspect, the palladium content may be 3-10 fold higher than the total non-palladium PGM content of the catalytic layer or catalyst article. Typically, the total PGM content of the catalyst article is 30-100 g/ft$^3$, 50-80 g/ft$^3$, or about 75 g/ft$^3$.

As used herein, the term "palladium-free" with reference to a layer of the catalyst article or a composition of the catalyst article means no palladium is added to the layer or composition. However, trace amounts of residual palladium may be present in the layer or composition as a contaminant from other ingredients included in the layer or composition. Such trace amounts are included in the term "palladium-free" and typically constitute no more than 0.5%, preferably less than 0.5% and most preferably 0% of the layer or composition by weight.

As used herein, the term "substantially uniform" with respect to a layer of the catalyst article means the surface of the layer is free of defects over at least about 90% of the total surface area. The substantially uniform surface exhibits no more than about 10% of the total surface area of the layer of cracks, fissures or flaking of the surface of the layer.

As used herein, the term "support" with respect to a catalytic layer refers to a material that receives platinum group metals, stabilizers, promoters, binders, and the like through association, dispersion, impregnation, or other suitable methods. Examples of supports include, but are not limited to, refractory metal oxides, high surface area refractory metal oxides and materials containing oxygen storage components. High surface area refractory metal oxide supports include activated compounds selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Examples of materials containing oxygen storage components include, but are not limited to, ceria-zirconia, ceria-zirconia-lanthana, zirconia-praseodymia, yttria-zirconia, zirconia-neodymia and zirconia-lanthana. In certain embodiments, the support comprises bulk rare earth metal oxide such as bulk ceria having a nominal rare earth metal content of 100% (i.e., >99% purity).

As used herein, the term "oxygen storage component" (OSC) refers to a material that has a multi-valence state and can actively react with oxidants such as oxygen or nitrous oxides under oxidative conditions, or with reductants such as carbon monoxide (CO) or hydrogen under reduction conditions. Examples of oxygen storage components include ceria and praseodymia. Delivery of an OSC to a layer can be achieved by the use of, for example, mixed oxides. For example, ceria can be delivered by a mixed oxide of cerium and zirconium, a mixed oxide of cerium, zirconium, and neodymium and/or a mixed oxide of cerium, zirconium, lanthanum and praseodymium. In another example, praseodymia can be delivered by a mixed oxide of praseodymium and zirconium, and/or a mixed oxide of praseodymium, cerium, lanthanum, yttrium, zirconium, and neodymium.

As used herein, the term "impregnated" means that a platinum group metal-containing solution is put into pores of a support. In detailed embodiments, impregnation of platinum group metals is achieved by incipient wetness, where a volume of diluted platinum group metal is approximately equal to the pore volume of the support bodies. Incipient wetness impregnation generally leads to a substantially uniform distribution of the solution of the precursor throughout the pore system of the support.

As used herein, the term "component" in connection with a platinum group metal means any compound, complex, or the like which, upon calcination or use thereof, decomposes or otherwise converts to a catalytically active form of the platinum group metal, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are utilized. For example, suitable compounds include palladium nitrate. During the calcination step, or at least during the initial phase of use of the composite, such compounds are converted into a catalytically active form of the metal or a compound thereof.

In a first aspect, the catalyst article of the invention is a high-palladium article comprising: a first catalytic layer on a suitable substrate, the catalytic layer comprising a high level of a palladium. All palladium components present in the catalyst article are contained in the first catalytic layer. A portion of the palladium component in the first catalytic layer may be supported on a refractory metal oxide support, preferably a high surface area refractory metal oxide support. The remaining portion of the palladium component in the first catalytic layer is supported on a ceria-free oxygen storage component, preferably zirconia doped with praseodymia, lanthana, neodymia, yttria or a mixture thereof. Alternatively, all of the palladium may be supported on the ceria-free oxygen storage component. The first catalytic layer may further comprise a platinum component supported on a refractory metal oxide, which may be an alumina-containing support. The first catalytic layer is coated with a second catalytic layer comprising a rhodium component and a platinum component supported on a ceria-containing oxygen storage component. The second catalytic layer is palladium-free and substantially free of non-ceria oxygen storage components.

In a further aspect, the OSC of the first catalytic layer is a praseodymia-zirconia composite, an yttria-zirconia composite, a neodymia-zirconia composite or a lanthana-zirconia composite wherein the rare earth component of the composite represents about 1-40% by weight. In the second catalytic layer the composite may comprise bulk ceria or ceria in a composite with small amounts of zirconia, lanthana, neodymia or praseodymia. The composite may be prepared using methods known in the art, including co-precipitation, sol gels and mixing of the rare earth metal oxide with zirconia. The presence of a rare earth metal oxide in such composites typically imparts improved thermal stability to the zirconia component.

Another aspect of the invention provides that the palladium component of the catalyst article is present by weight in amounts higher than either or both of the platinum component and the rhodium component. The ratio of platinum to palladium to rhodium (Pt/Pd/Rh) by weight may be 0.5-5/2-80/0.1-5, 1-3/5-40/0.25-2 or about 2/9/1, respectively. That is, in a specific embodiment, the palladium content of the catalyst article is about 4 to 5 times the platinum content and about 8 to 10 times the rhodium content.

Other aspects of the invention provide that the second catalytic layer comprises a ceria OSC with a high content of cerium. The platinum and rhodium components are supported on the ceria OSC. In one or more embodiments, the ceria OSC comprises bulk ceria (providing essentially 100% cerium). Alternatively the high cerium-content OSC may comprise about 55-65% ceria, about 2-4% lanthana, about 6-8% praseodymia and about 25-35% zirconia, or; about 40-50% ceria, about 4-5% neodymia and about 45-50% zirconia. The second catalytic layer is palladium-free, substantially free of non-ceria OSC's and substantially free of refractory metal oxides as defined above. The rhodium and platinum components are entirely supported on the ceria OSC.

Other aspects of the invention provide methods for treating a gas comprising hydrocarbons, carbon monoxide, and nitrogen oxides, the method comprising: contacting the gas in an exhaust stream of a gasoline engine with a catalytic material on a substrate, the catalytic material comprising the two catalytic layers described herein, with or without an optional etch coat layer underlying the first catalytic layer, such that hydrocarbon, carbon monoxide and NOx in the exhaust stream are reduced. In particular, CO in the exhaust stream is substantially reduced by the catalyst articles of the invention after rich aging as compared to catalyst articles wherein the second catalytic layer has a lower content of cerium (typically present as a ceria-refractory metal oxide composite) and includes refractory metal oxides as supports for platinum and rhodium.

One aspect of the invention provides a catalyst article comprising: a catalytic material on a substrate, the catalytic material comprising the two catalytic layers described herein and the catalyst article further comprising an etch coat layer between the substrate and the first catalytic layer. The etch coat layer comprises a high surface area refractory metal oxide and is preferably prepared such that the surface is substantially uniform. A substantially uniform surface on the etch coat provides improved bonding of the first catalytic layer to the substrate and is particularly advantageous when the catalyst article is used in high-vibration environments such as small engines. Fast and thorough drying of the etch coat facilitates production of the substantially uniform surface and may be achieved by drying the layer at lower temperatures under moving air. Thorough drying of the etch coat also contributes to achievement of an even distribution of the palladium component in the first catalytic layer.

In one embodiment, significant improvement in the reduction of CO emissions from a carbureted gasoline engine, such as a motorcycle engine, can be obtained using the catalyst articles of the invention. Improvement in hydrocarbon conversion may also be achieved. NOx conversion performance is typically comparable to known catalyst articles; however, NOx reduction is of less concern in motorcycle applications than CO reduction. The catalyst articles of the invention exhibit substantially improved CO conversion performance under rich engine operating conditions such as commonly occur in small carbureted engines.

In detailed aspects, the ceria-free oxygen storage component is typically present in the first catalytic layer in an amount of 10-60%, 30-50% or 40-50% by weight of the components of the first catalytic layer. The ceria oxygen storage component in the second catalytic layer is typically present in an amount of 20-100%, 40-100%, 60-100% or 80-100% by weight of the components of the second catalytic layer.

One or more embodiments provide that the PGM components are present in an amount of about 10-150 g/ft$^3$, about 20-100 g/ft$^3$, or about 40-80 g/ft$^3$. In a specific embodiment, the PGM components are present in an amount of about 45 g/ft$^3$, 60 g/ft$^3$ or 75 g/ft$^3$ in the catalyst article. It will be understood that the content of each PGM in the catalyst article, and therefore their relative weight ratios, may be varied to achieve the desired total PGM content. It is generally preferred that palladium be present in higher amounts relative to platinum and rhodium to reduce the cost, however this is not required for the function of the catalyst article. Typically, platinum is present at 1-90 g/ft$^3$, palladium is present at 1-90 g/ft$^3$, and rhodium is present at 1-30 g/ft$^3$. In a specific embodiment platinum is present at 2-20 g/ft$^3$, palladium is present at 20-70 g/ft$^3$ and rhodium is present at 1-10 g/ft$^3$. In further specific embodiments, total PGM is 45 g/ft$^3$, 60 g/ft$^3$ or 75 g/ft$^3$, optionally with a Pt/Pd/Rh ratio of 2/9/1.

A detailed embodiment provides two catalytic layers on the substrate. A first catalytic layer is a high-palladium layer coated on the substrate and comprises palladium impregnated on praseodymia-doped zirconia and alumina, and platinum impregnated on alumina. The first catalytic layer is coated on the substrate and calcined. A second catalytic layer is coated on the first catalytic layer and comprises rhodium and platinum impregnated on a bulk ceria-OSC. The second catalytic layer is also calcined.

A second detailed embodiment provides three layers on the substrate. A first layer coated on the substrate is an etch coat layer comprising a refractory metal oxide such as gamma alumina. The etch coat layer is coated and dried on the substrate such that its surface is substantially uniform, i.e., substantially free of defects such as cracks, fissures and flaking. The first catalytic layer comprises a ceria-free OSC support, e.g., praseodymia-doped zirconia, and a high surface area refractory metal oxide such as gamma alumina impregnated with palladium and palladium/platinum, respectively. A second catalytic layer coated on the first catalytic layer comprises platinum and/or rhodium but does not contain palladium. The second catalytic layer comprises rhodium and platinum impregnated on a ceria OSC support which is substantially free of refractory metal oxides such as zirconia and alumina and substantially free of non-ceria OSC's such as lanthana, praseodymia and neodymia. The weight ratio of platinum/palladium/rhodium is typically 0.5-5/2-80/0.1-5, 1-3/5-40/0.25-2 or about 2/9/1.

In another aspect, provided is a method for treating a gas comprising hydrocarbons, carbon monoxide, and nitrogen oxides, the method comprising: contacting the gas in an exhaust stream of a gasoline engine with a catalytic material on a substrate, the catalytic material comprising two catalytic layers as described herein. Optionally, the catalytic material may further comprise an etch coat layer as described herein coated on the substrate prior to deposition of the first catalytic layer. In a further aspect, the first catalytic layer of the catalytic material is coated on an etch coat comprising a high surface area refractory metal oxide, wherein the etch coat surface is substantially uniform. According to the invention, this method is effective to remove significantly more CO from exhaust gas under rich engine operating conditions than catalytic materials wherein the cerium content of the second catalytic layer is lower and significant amounts of refractory metal oxides and/or non-ceria OSC's are present. Improved reduction in hydrocarbons may also be achieved under rich engine operating conditions using the catalyst materials of the invention.

A further aspect provides a method of making a catalyst article, the method comprising: optionally, forming an etch coat on a substrate by coating a refractory metal oxide, preferably a high surface area refractory metal oxide, on the substrate. Coating may be accomplished by any of the coating methods known in the art, such as manual dipping or airbrushing. The etch coat is subsequently dried using heat and air, preferably selecting the temperature and airflow such that a substantially uniform etch coat surface is formed. The drying temperature can be in the range of about 60-140° C. A gentle to moderate airflow is maintained across the substrate during the drying of the etch coat, as may be provided by a conventional fan. The etch coat layer is then calcined, typically at 490-550° C. for 1-2 hrs. The first catalytic layer is coated on the etch coat.

The first catalytic layer coating is accomplished by depositing on the etch coat or directly on the substrate a high-palladium catalytic material comprising palladium impregnated on a ceria-free, rare earth-doped zirconia support and platinum impregnated on a refractory metal oxide support. The rare earth component of the OSC in the first catalytic layer may be 1-40% by weight of the composite. The first catalytic layer is then dried and calcined, typically at 490-550° C. for 1-2 hrs. A second catalytic layer is coated on the first catalytic layer. The second catalytic layer comprises platinum and rhodium supported on a ceria OSC, wherein the ceria OSC support has a high content of cerium and is substantially free of refractory metal oxides and substantially free of non-ceria OSC's. The second catalytic layer is palladium-free. The cerium-containing OSC in the second catalytic layer may be, for example, bulk ceria (100% $CeO_2$) or a composite of ceria with refractory metal oxides and/or non-ceria OSC's provided the ceria content of the material is at least about 40%, at least about 45% or at least about 60% by weight. The ratio of PGM content of the catalyst article is typically about 0.5-5/5-15/0.1-5, 1-3/5-40/0.25-2 or about 2/9/1 by weight (Pt/Pd/Rh).

Details of the components of a catalyst article according to the invention are provided below.

The Substrate

According to one or more embodiments, the substrate may be any of the materials typically used for preparing TWC catalysts and will preferably comprise a metal or ceramic structure. Any suitable substrate may be employed, such as a monolithic substrate of the type having a plurality of fine, parallel gas flow passages extending therethrough from an inlet or an outlet face of the substrate, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic substrate are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic substrate may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α-alumina, aluminosilicates and the like.

The substrates useful for the layered catalyst composites of the present invention may also be metallic in nature and be composed of one or more metals or metal alloys. The metallic substrates may be employed in various shapes such as corrugated sheet, metal plate, wire mesh or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal substrates may be oxidized at high temperatures, e.g., 1000° C. and higher, to improve the corrosion resistance of the alloy by forming an oxide layer on the surface the substrate. Such high temperature-induced oxidation may enhance the adherence of the refractory metal oxide support and catalytically-promoting metal components to the substrate.

The Catalytic Materials

The catalytic materials of the present invention are formed in two layers. The composition for each catalytic layer is prepared as a slurry of the PGM component and this slurry is used to form the layers on the substrate. The materials can readily be prepared by processes well known in the prior art. A representative process is set forth below. As used herein, the term "washcoat" has its usual meaning in the art of a thin, adherent coating of a catalytic or other material applied to a substrate carrier material, such as a honeycomb-type substrate member or wire mesh, which is sufficiently porous to permit the passage there through of the gas stream being treated.

For a layer of a specific washcoat, finely divided particles of a high surface area refractory metal oxide such as gamma alumina, or an OSC, such as praseodymia-zirconia, are slurried in an appropriate vehicle, e.g., water. The substrate may then be dipped one or more times in such slurry or the slurry may be coated on the substrate such that there will be deposited on the substrate the desired loading of the metal oxide or OSC, e.g., about 0.5 to about 2.5 g/in³ per dip. To incorporate components such as platinum group metals (e.g., palladium, rhodium, platinum, and/or combinations of the same), stabilizers and/or promoters, such components may be incorporated in the slurry as a mixture of water soluble or water-dispersible compounds or complexes. Thereafter, the coated substrate is calcined by heating, e.g., at 500-600° C. for about 1 to about 3 hours. Typically, the PGM component is utilized in the form of a compound or complex to achieve dispersion of the component on the refractory metal oxide support. A suitable method of preparing any catalytic layer of the catalyst article of the invention is to prepare a mixture of a solution of a desired platinum group metal component and at least one support, such as a finely divided, high surface area, refractory metal oxide support, e.g., gamma alumina or zirconia-coated alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry. Platinum group metal components may also be impregnated in the oxygen storage component, e.g., ceria-zirconia or praseodymia-doped zirconia, in a similar manner prior to addition to the slurry.

In one embodiment, the slurry is thereafter comminuted to reduce the particle size of the support. The comminution may be accomplished in a ball mill or other similar equipment, and the solids content of the slurry may be, e.g., about 20-60 wt %, more particularly about 30-40 wt %.

Additional layers may be prepared and deposited upon the first catalytic layer in the same manner as described above for deposition of the first catalytic layer.

Before describing several exemplary embodiments of the invention, it is to be understood that the invention is not limited to the details of construction or process steps set forth in the following description. The invention is capable of other embodiments and of being practiced in various ways. The following non-limiting examples are intended to illustrate certain embodiments of the present invention.

EXAMPLE 1

Effect of Aging Conditions on Water Gas Shift Reaction

Effect of hydrothermal aging on water gas shift reaction (WGS) was evaluated as follows: the catalyst (Reference Catalyst A, 40 g/ft³, 2/4/1) was washcoated on a metallic substrate (1" diameter and 2" long, 300 cpsi) then was tested in a lab reactor at 70,000 1/h, 450° C. The gas composition was: CO~5.4%, CO2~10%, $C_3H_6$ plus $C_3H_8$ (at 2 ratio) ~360 ppm and NO~500 ppm. Air and $N_2$ flows were controlled for lambda=0.94. The test was conducted under both wet conditions ($H_2O$~6%) and dry conditions with no $H_2O$ in the feed.

The results are shown in FIG. 1, which demonstrates a negligible decrease in CO conversion after aging attributable to a reduction in the oxidation reaction. In contrast, the decrease in CO conversion due to reduction in the WGS was substantially larger, and was reduced from over 60% to less than 40% conversion. We conclude that the WGS is important for efficient CO conversion under rich conditions and that maintaining the activity of the WGS reaction contributes to improved catalyst stability and durability after aging.

EXAMPLE 2

Effect of Cerium Content on Available PGM Surface

Ceria OSC's containing varying amounts of ceria relative to non-ceria and refractory metal oxide components were impregnated with each of 0.5% platinum, 0.25% rhodium and 0.5% platinum/0.25% rhodium. The OSC support compositions are shown in Table 1.

TABLE 1

| Support # | $CeO_2$ | $LaO_3$ | $Pr_6O_{11}$ | $Nd_2O_3$ | $ZrO_2$ | $Al_2O_3$ |
|---|---|---|---|---|---|---|
| #1 | 100% | — | — | — | — | — |
| #2 | 59.9% | 3.1% | 7% | — | 30% | — |
| #3 | 45.6% | — | — | 4.8% | 49.6% | — |
| #4 | — | — | — | — | 18.2% | 81.8% |
| #5 | — | 3% | — | — | 20% | 77% |

For evaluation of PGM available metal surface, CO chemisorption followed by diffuse reflectance FT-IR (DRIFTS) was used. A catalyst sample was first loaded into the sample cup of a Pike diffuse reflectance chamber in a Varian FTS-7000 spectrometer equipped with an MCT detector and then reduced with 7% $H_2$ in argon (flow rate: 40 cc/min) at 400° C. for 1 h. After cooling down to 30° C. in argon, the DRIFT spectrum was collected at a spectral resolution of 2 $cm^{-1}$. After that, 1% CO in argon was introduced at 40 cc/min into the sample chamber and spectra were collected until equilibrium was reached. Difference spectra were obtained by taking the ratio of the spectrum with CO adsorption against the spectrum before introducing CO. The bands in the spectra corresponding to CO chemisorbed on the PGM metal surface were integrated and the band intensity was taken as a measure of the available PGM metal surface.

Figure 2A:
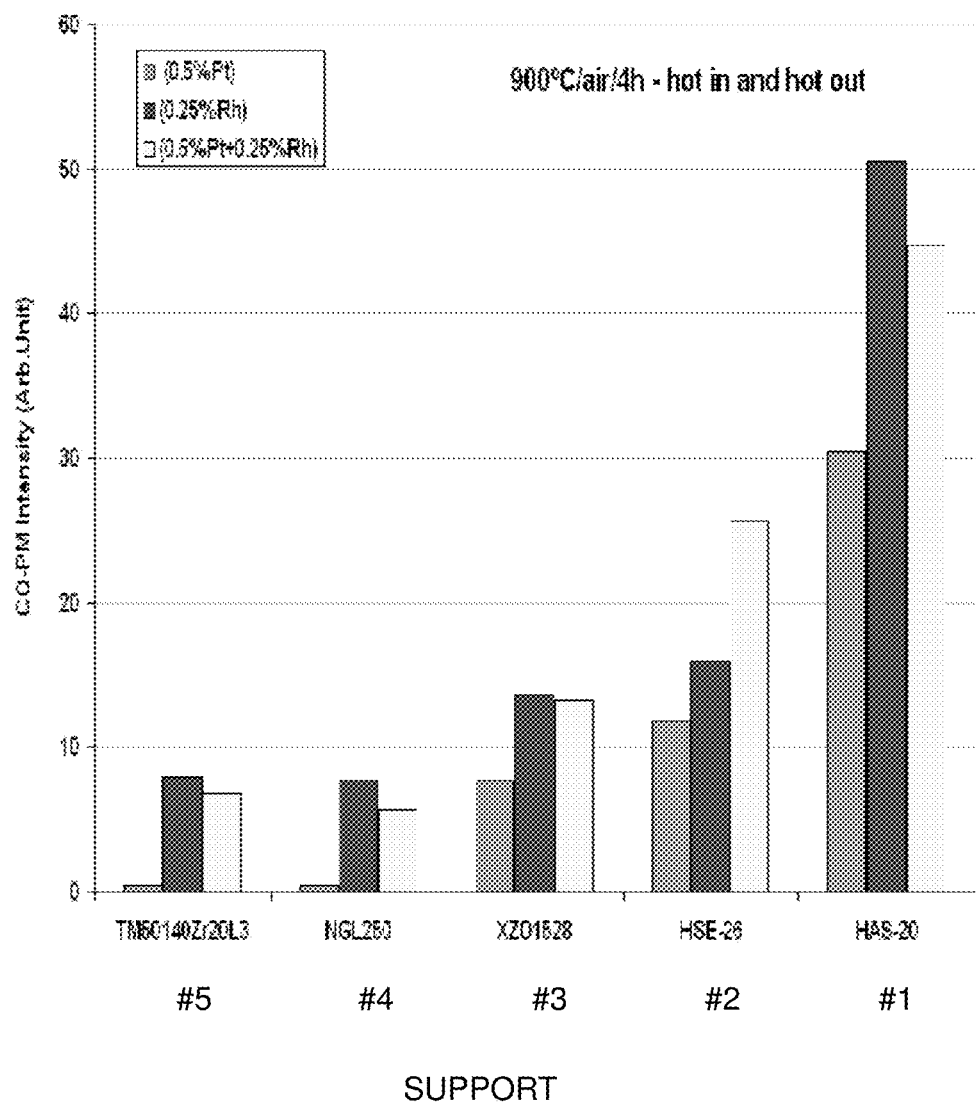
FIG. 2A and FIG. 2B are bar graphs comparing available PGM surface after lean and rich aging for OSC's containing varying amounts of ceria.
Figure 2B:
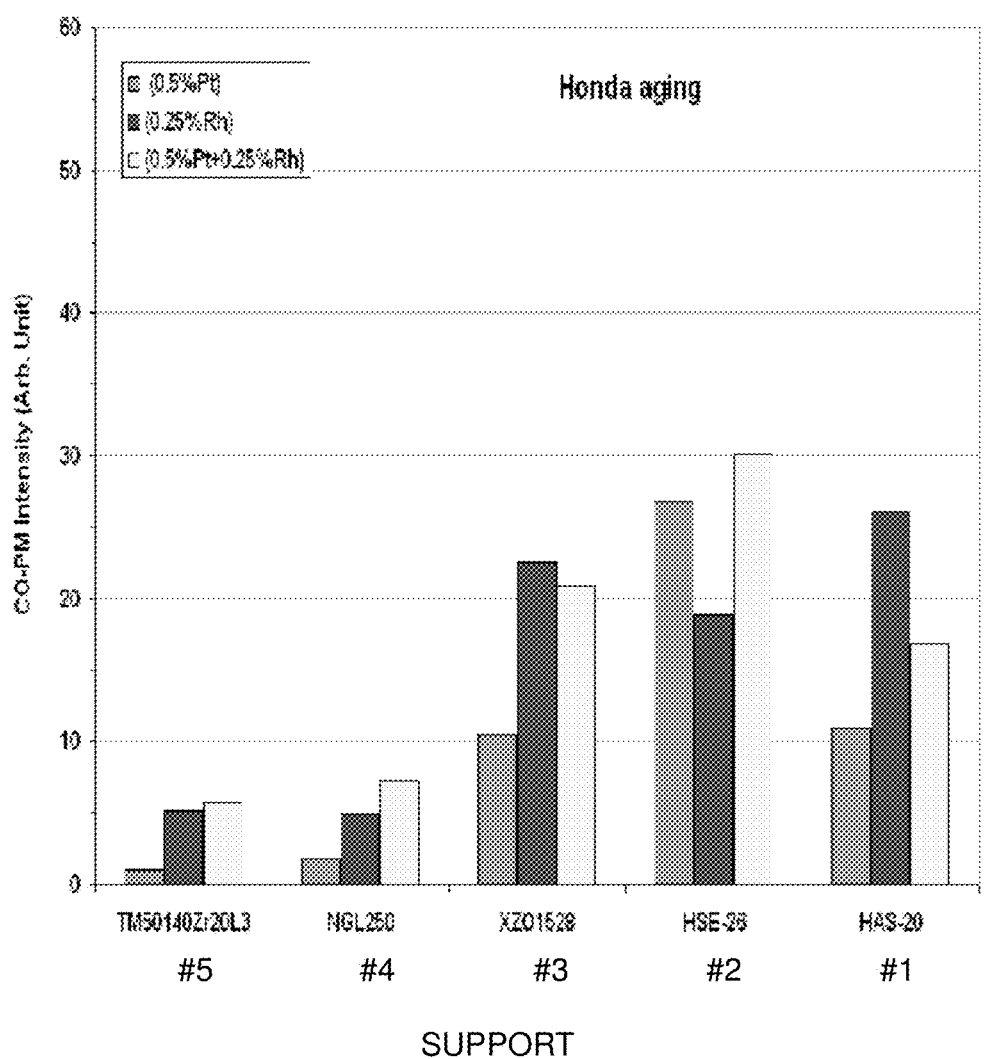

The results are shown in FIG. 2A and FIG. 2B, which demonstrate that the available PGM surface after rich aging is substantially higher for the catalysts containing from 45.6% to 100% ceria. In addition, the bulk ceria support had a substantially higher available PGM surface after lean aging as compared to supports which were ceria composites or which contained no ceria.

EXAMPLE 3

Performance Testing for Aged Catalyst

Catalyst Preparation—A cylindrical metallic honeycomb substrate was used as the carrier. The carrier had a diameter of 1.57 inches, a length of 3.54 inches and total volume of 6.9 cubic inch. Three catalysts according to the invention and one catalyst for use as a control were prepared. The total precious metal content of the inventive catalysts was 45 g/ft³, 60 g/ft³ and 75 g/ft3. The controls catalyst had a total precious metal content of 100 g/ft³. The precious metal component consisted of platinum, palladium and rhodium in a ratio of 2/9/1, respectively, in each catalyst. The metallic carrier was pretreated at 930° C. for 6 hours to form a thin layer of alumina on the surface.

A first catalytic layer in the form of an aqueous solution was applied to the surface of the carrier. The slurry used for the first catalytic layer of the 75 g/ft³ catalyst consisted of an approximately 40% solid content, aqueous solution containing 228 g of alumina, 228 g of Pr-doped zirconia, 30 g of barium hydroxide, 12.4 g of Pd impregnated on alumina and Pr-doped zirconia as Pd nitrate solution and 0.27 g of Pt impregnated as Pt nitrate solution. The slurries for the remaining two inventive catalysts were adjusted to obtain the desired catalyst ratio and loading. The slurry for the first catalytic layer of the control catalyst consisted of 226 g of alumina, 226 g of Pr-doped Zirconia, 16.34 g of Pd impregnated on alumina and Pr-doped zirconia as Pd Nitrate solution and 0.36 g of Pt impregnated as Pt-nitrate solution. The coated carriers were then calcined at 550° C. for 1 hour to obtain a dried washcoat at approximately 1.64 g/in$^3$.

A top layer (i.e., the second catalytic layer) in the form of an aqueous solution was then applied to the surface of the carrier already coated with the first catalytic layer. The aqueous slurry used for the top coat of the 75 g/ft$^3$ catalyst (Catalyst 3) contained 2.87 g of platinum impregnated as platinum nitrate solution and 1.59 g of rhodium impregnated as rhodium nitrate solution by a planetary mixture into 418 g of the oxygen storage component (bulk ceria) and 66 g of Zr-doped alumina. The slurries for the remaining two inventive catalysts were adjusted to obtain the desired catalyst ratio and loading (Catalyst 1—45 g/ft$^3$; Catalyst 2~60 g/ft$^3$). The slurry for the second catalytic layer of the control catalyst (Control~100 g/ft$^3$) consisted of 208 g of Zr-doped alumina, 283 g of oxygen storage component (Ce—Zr—Nd containing powder), 3.28 g of Pt impregnated on Zr-doped alumina and oxygen storage component as Pt-nitrate solution and 1.82 g of Rh impregnated on Zr-doped alumina and oxygen storage component as rhodium nitrate solution. The resultant carriers were then calcined at 550° C. for 1 hour to obtain a dried washcoat at approximately 1.33 g/in$^3$.

Performance Testing

The samples were evaluated at the aforementioned lab reactor at 40,000 space velocity with gas composition as follows: CO~0.5-5.6%; CO$_2$~10%, HC(C1)~1350 ppm (C$_3$H$_6$/C$_3$H$_8$=2); NO~400 ppm; H$_2$O~6-7%. The lambda varied with CO/O$_2$ to match rich (lambda~0.93) and lean (lambda~1.04) conditions. Steam aging was conducted at 950° C., 10% H2O in air for 4 hours.

Figure 3:
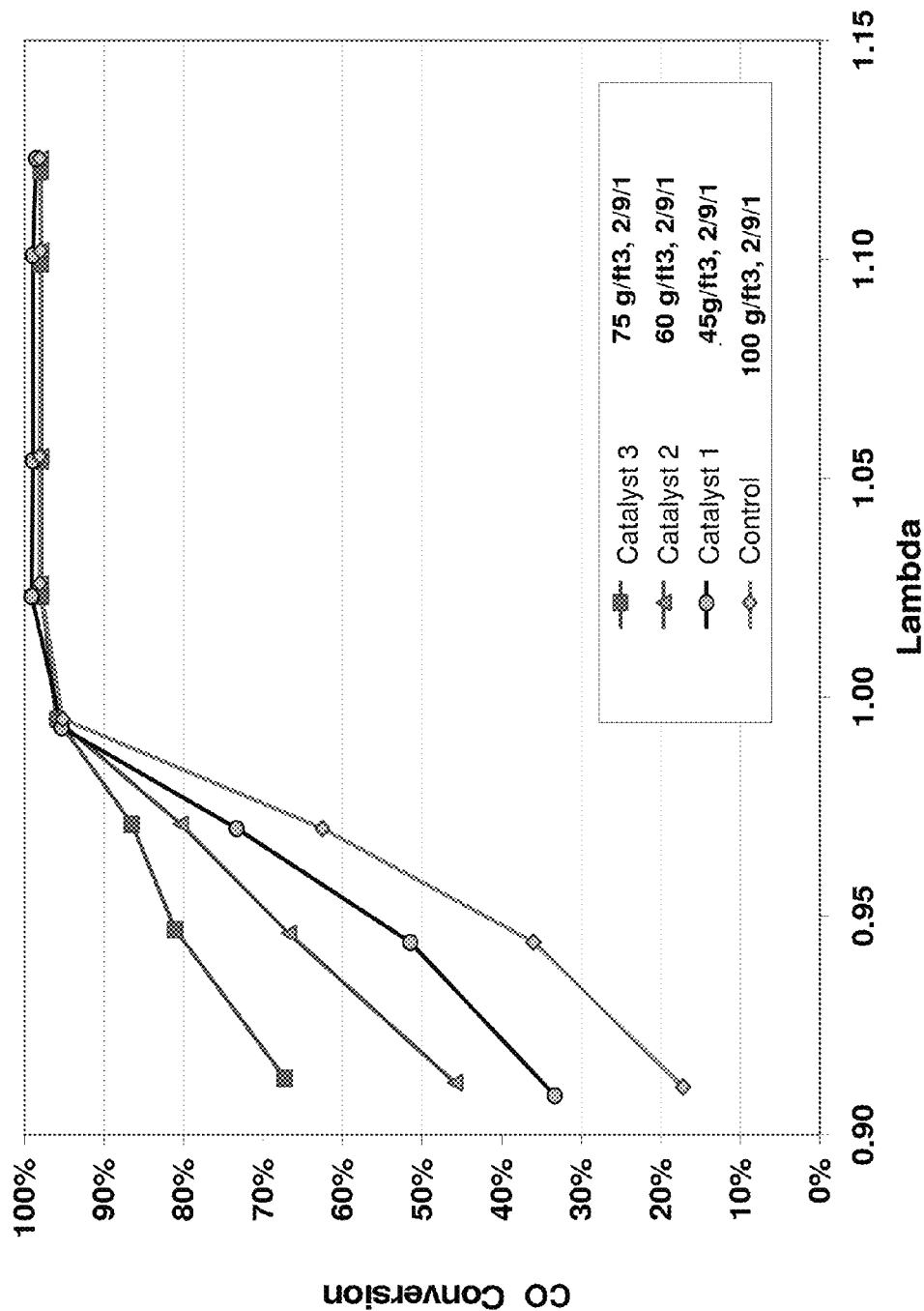
FIG. 3 is a graph of CO conversion efficiency for the inventive catalysts under rich and lean operating conditions.
Figure 4:
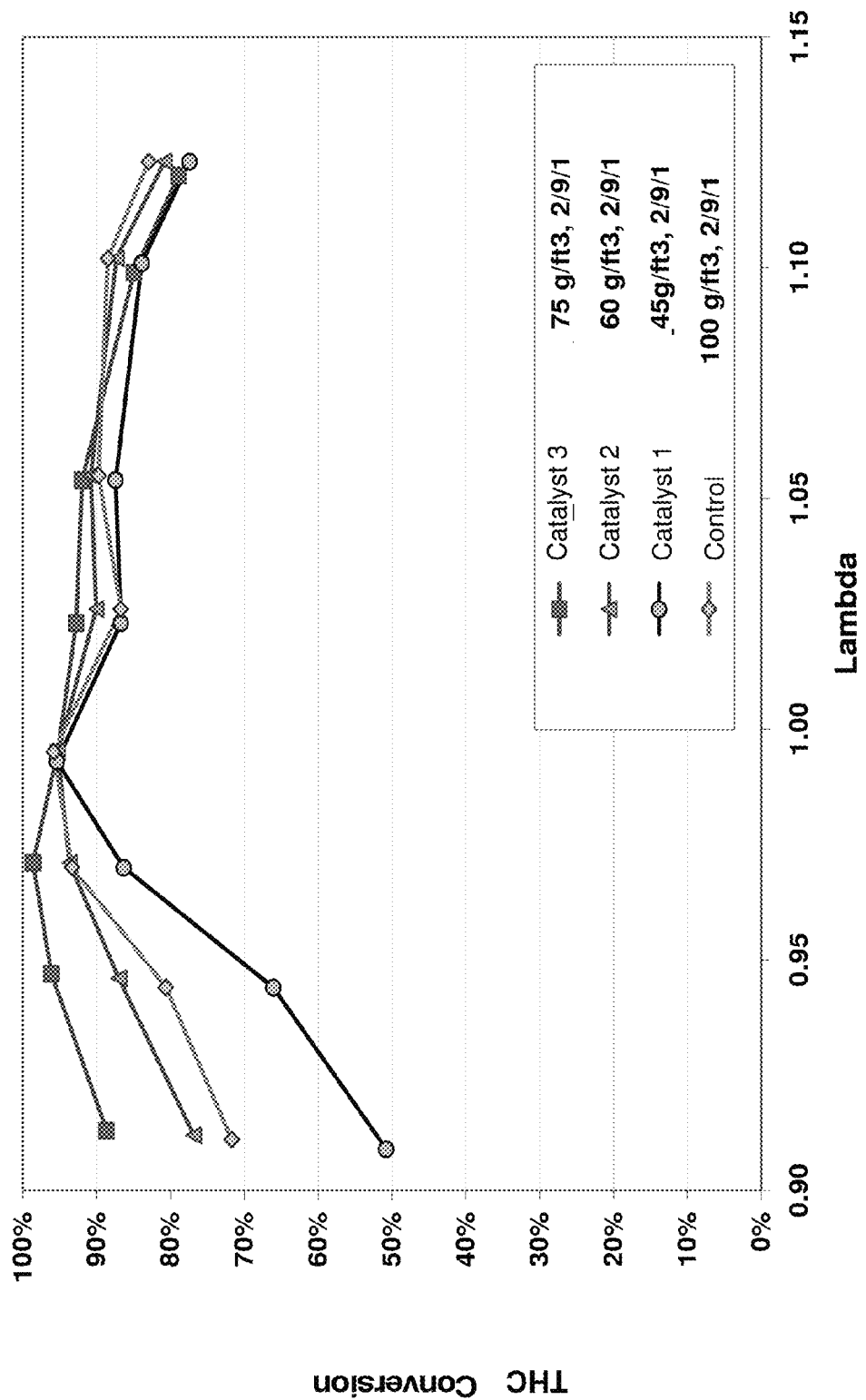
FIG. 4 is a graph of HC conversion efficiency for the inventive catalysts under rich and lean operating conditions.

The results are shown in FIG. 3 and FIG. 4. The catalysts containing a 100% ceria OSC support in the second catalytic layer provided significantly improved CO conversion at lambda<1 (where CO emissions are typically increased) compared to the control catalyst having ceria/zirconia composite oxide and zirconia coated alumina supports for platinum and rhodium in the second catalytic layer. Total hydrocarbon conversion was similarly improved at lambda<1 using the inventive catalysts. For both CO and THC, conversion efficiency increased with increasing PGM loading. NOx conversion for the inventive catalysts (data not shown) was equivalent to the control catalyst through the entire lambda sweep and gave about 100% conversion at lambda<1.

What is claimed is:

1. A catalyst article for use in an internal combustion engine comprising:
    a first catalytic layer formed on a substrate, wherein the first catalytic layer comprises palladium impregnated on a ceria-free oxygen storage component and platinum impregnated on a refractory metal oxide, and;
    a palladium-free second catalytic layer formed on the first catalytic layer, the second catalytic layer comprising platinum and rhodium impregnated on a ceria-containing oxygen storage component, wherein the ceria-containing oxygen storage component is substantially free of refractory metal oxides and substantially free of non-ceria oxygen storage components,
    wherein the catalyst article is effective to reduce carbon monoxide in exhaust gas from the internal combustion engine.

2. The article of claim 1 further comprising an etch coat layer on the substrate, wherein the etch coat layer underlies the first catalytic layer and comprises a high surface area refractory metal oxide.

3. The article of claim 1 wherein the palladium in the first catalytic layer is impregnated on zirconia-praseodymia and the platinum in the first catalytic layer is impregnated on alumina.

4. The article of claim 3 further comprising palladium impregnated on the alumina.

5. The article of claim 1 wherein the oxygen storage component of the second catalytic layer contains from about 40% to about 100% ceria.

6. The article of claim 1 which comprises a total of 20-100 g/ft$^3$ of platinum group metal.

7. The article of claim 6 which comprises a total of 40-80 g/ft$^3$ of platinum group metal.

8. The article of claim 7 which comprises 1-90 g/ft$^3$ platinum, 1-90 g/ft$^3$ palladium and 1-30 g/ft$^3$ rhodium.

9. The article of claim 1 which has a ratio of platinum/palladium/rhodium of 0.5-5/2-80/0.1-5 by weight, respectively.

10. The article of claim 9 which has a ratio of platinum/palladium/rhodium of 1-3/5-40/0.25-2 by weight, respectively.

11. A method of treating engine exhaust comprising hydrocarbons, carbon monoxide and nitrogen oxides comprising:
    contacting the exhaust with a catalyst article, wherein the catalyst article comprises a first catalytic layer coated on a substrate, the first layer comprising palladium impregnated on a ceria-free oxygen storage component and platinum impregnated on a refractory metal oxide, and;
    a palladium-free second catalytic layer formed on the first catalytic layer, the second layer comprising platinum and rhodium impregnated on a ceria-containing oxygen storage component, wherein the ceria-containing oxygen storage component is substantially free of refractory metal oxides and substantially free of non-ceria oxygen storage components,
    wherein the method is effective to reduce carbon monoxide in the exhaust.

12. The method of claim 11 wherein the catalyst article further comprises an etch coat layer on the substrate, wherein the etch coat layer underlies the first catalytic layer.

13. The method of claim 11 wherein the exhaust is contacted with a catalyst article comprising a) palladium impregnated on praseodymia-doped zirconia and platinum impregnated on alumina in the first catalytic layer, and b) platinum and rhodium impregnated on bulk ceria in the second layer.

14. The method of claim 13 wherein the ratio of platinum/palladium/rhodium is 0.5-5/2-80/0.1-5 by weight, respectively.

15. The method of claim 14 wherein the exhaust is contacted with a catalyst article comprising a total of 20-100 g/ft$^3$ of platinum group metal.

16. The method of claim 15 wherein the exhaust is contacted with a catalyst article comprising 1-90 g/ft$^3$ platinum, 1-90 g/ft$^3$ palladium and 1-30 g/ft$^3$ rhodium.

17. A method of making a catalyst article comprising:
    forming a first layer on a substrate by depositing a slurry on the substrate, the slurry comprising palladium impregnated on a ceria-free oxygen storage component and platinum impregnated on a refractory metal oxide;
    drying the first layer;
    forming a palladium-free second layer on the first layer by depositing a slurry on the first layer, the slurry comprising platinum and rhodium impregnated on a ceria-containing oxygen storage component, wherein the ceria-containing oxygen storage component is substantially free of refractory metal oxides and substantially free of non-ceria oxygen storage components, and drying the second layer.

18. The method of claim 17 wherein a total of 20-100 g/ft$^3$ of platinum group metals is formed on the catalyst article.

19. The method of claim 18 wherein 1-90 g/ft$^3$ platinum, 1-90 g/ft$^3$ palladium and 1-30 g/ft$^3$ rhodium are formed on the catalyst article.

20. The method of claim 17 wherein platinum, palladium and rhodium are deposited on the catalyst article in a ratio of 0.5-5/2-80/0.1-5 by weight, respectively.

* * * * *

UNITED STATES PATENT AND TRADEMARK OFFICE
CERTIFICATE OF CORRECTION

PATENT NO. : 8,828,343 B2  Page 1 of 1
APPLICATION NO. : 13/038784
DATED : September 9, 2014
INVENTOR(S) : Xinsheng Liu et al.

It is certified that error appears in the above-identified patent and that said Letters Patent is hereby corrected as shown below:

In the Drawings,

Sheet 3, Fig. 2B, the title "Honda aging" should read --900 degrees C/lean-rich/4h--.

Signed and Sealed this
Seventeenth Day of February, 2015

Michelle K. Lee
*Deputy Director of the United States Patent and Trademark Office*